(12) United States Patent
Medina et al.

(10) Patent No.: US 12,504,057 B2
(45) Date of Patent: Dec. 23, 2025

(54) EPICYCLIC GEAR SYSTEM

(71) Applicant: Goodrich Actuation Systems SAS, Vernon (FR)

(72) Inventors: Raphaël Medina, Pierrefitte sur Seine (FR); Maxime Serrand, Paris (FR); Thomas Moulon, Ermont (FR); Vincent Potel, Lierville (FR)

(73) Assignee: GOODRICH ACTUATION SYSTEMS SAS, Vernon (FR)

( * ) Notice: Subject to any disclaimer, the term of this patent is extended or adjusted under 35 U.S.C. 154(b) by 0 days.

(21) Appl. No.: 18/406,923

(22) Filed: Jan. 8, 2024

(65) Prior Publication Data
US 2024/0229899 A1    Jul. 11, 2024

(30) Foreign Application Priority Data
Jan. 10, 2023   (EP) .................................. 23305030

(51) Int. Cl.
*F16H 1/46*    (2006.01)
*F16H 57/08*    (2006.01)
(Continued)

(52) U.S. Cl.
CPC ............. *F16H 1/46* (2013.01); *F16H 57/082* (2013.01); *F16H 2001/2872* (2013.01); *F16H 2001/2881* (2013.01); *F16H 2057/005* (2013.01)

(58) Field of Classification Search
CPC .. F16H 1/46; F16H 57/082; F16H 2001/2872; F16H 2001/2881; F16H 2001/289; F16H 2057/005; F16H 2200/201; F16H 2200/2097; B60K 1/02; H02K 7/116; B25F 5/001
(Continued)

(56) References Cited

U.S. PATENT DOCUMENTS 3,245,279 A * 4/1966 Baker ....................... F16H 1/28
475/331
3,640,150 A * 2/1972 Leiner ....................... F16H 1/46
475/332
(Continued)

FOREIGN PATENT DOCUMENTS

DE    3903517 A1    10/1989
EP    3306139 A1    4/2018

OTHER PUBLICATIONS

English translation of DE3903517A1; http://translationportal.epo.org; Aug. 5, 2024 (Year: 2024).*
(Continued)

*Primary Examiner* — Roger L Pang
(74) *Attorney, Agent, or Firm* — CANTOR COLBURN LLP

(57) ABSTRACT

A kit of parts to provide a reconfigurable epicyclic gear system, The kit of parts includes at least one sun gear; a planet carrier; a plurality of sets of planet gears configured to be mounted on the planet carrier and to mesh with the at least one sun gear; and a plurality of ring gears configured to mesh with the plurality of sets of planet gears; wherein the at least one sun gear, the plurality of sets of planet gears and the plurality of ring gears all have the same modulus such that they can be arranged in different configurations that each produce a different output torque.

18 Claims, 10 Drawing Sheets

(51) Int. Cl.
*F16H 1/28* (2006.01)
*F16H 57/00* (2012.01)

(58) Field of Classification Search
USPC ............... 475/331, 219, 339, 340, 341, 342
See application file for complete search history.

(56) References Cited

U.S. PATENT DOCUMENTS

| | | | | |
|---|---|---|---|---|
| 4,366,727 | A * | 1/1983 | Jonsson | F16H 1/46 |
| | | | | 475/342 |
| 4,768,400 | A * | 9/1988 | McKay | F16H 19/00 |
| | | | | 475/330 |
| 5,429,558 | A * | 7/1995 | Lagarde | F16H 1/2836 |
| | | | | 74/462 |
| 6,179,743 | B1 * | 1/2001 | Morrow | F16H 1/2818 |
| | | | | 475/344 |
| 7,122,926 | B2 | 10/2006 | Tesar | |
| 8,266,976 | B2 | 9/2012 | Waide | |
| 10,037,040 | B2 | 7/2018 | Hervieux et al. | |
| 2003/0189388 | A1 * | 10/2003 | Hashimoto | H02K 16/00 |
| | | | | 310/268 |
| 2010/0167867 | A1 * | 7/2010 | Sugitani | F16H 1/46 |
| | | | | 475/339 |
| 2011/0009232 | A1 * | 1/2011 | Kapelevich | F16H 37/041 |
| | | | | 475/331 |
| 2016/0069424 | A1 * | 3/2016 | Chhour | F16H 1/2863 |
| | | | | 475/331 |
| 2019/0390736 | A1 * | 12/2019 | Dai | F16H 55/0886 |
| 2022/0003313 | A1 | 1/2022 | Davis et al. | |
| 2023/0091328 | A1 * | 3/2023 | Mouly | F16H 1/28 |
| | | | | 415/122.1 |

OTHER PUBLICATIONS

Abstract for: DE3903517 (A1), Published: Oct. 19, 1989 (1 page).
European Search Report for Application No. 23305030.1, mailed Jun. 16, 2023, 13 pages.

* cited by examiner

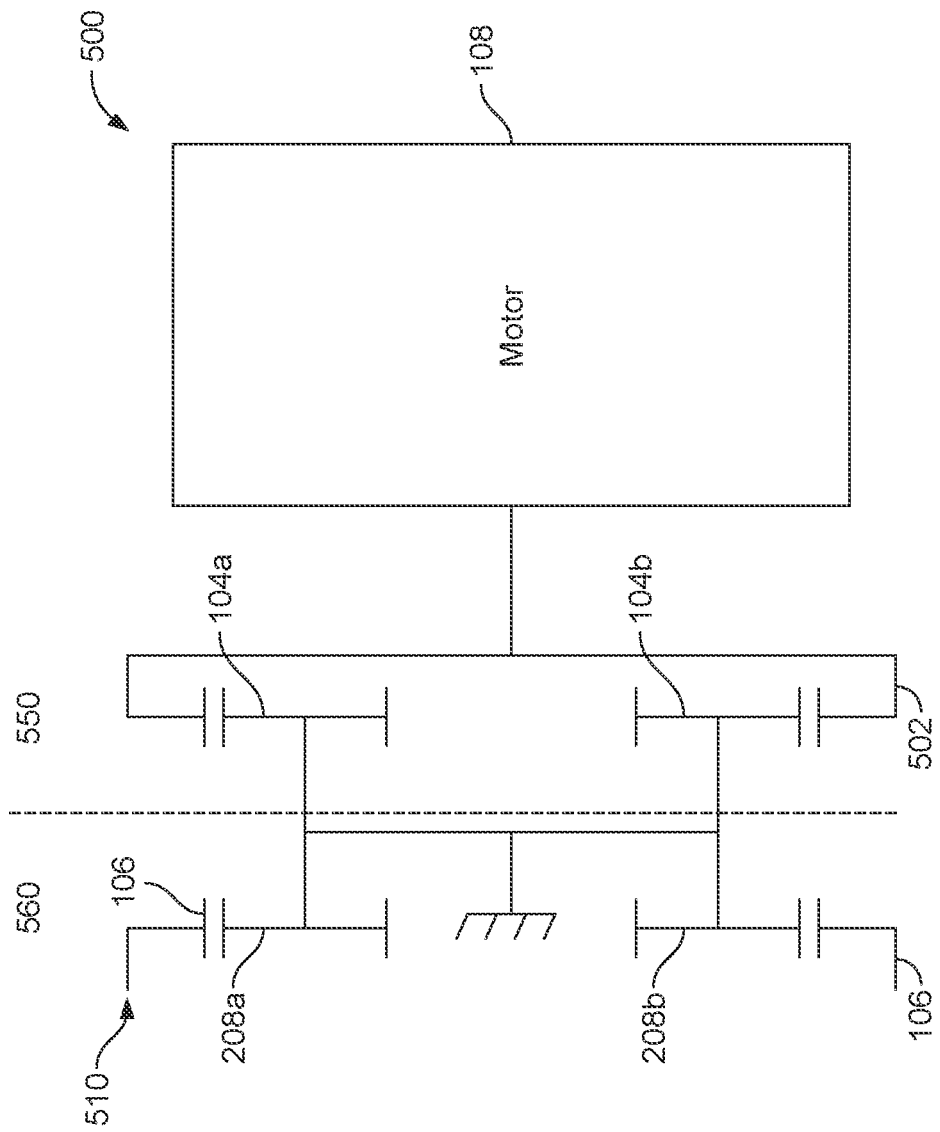

EPICYCLIC GEAR SYSTEM

CROSS REFERENCE TO RELATED APPLICATIONS

This application claims priority to European Patent Application No. 23305030.1 filed Jan. 10, 2023, the entire contents of which is incorporated herein by reference.

TECHNICAL FIELD

The present disclosure relates to gear systems and, in particular, to epicyclic gear systems.

BACKGROUND

Epicyclic gear systems, where a plurality of planet gears mounted on a carrier body mesh with a central sun gear and a surrounding ring gear, are known. In some configurations, the sun gear is driven as input. In other configurations, the ring gear is driven as input. One or more of the gear components of the epicyclic gear system (i.e. the sun gear, the plurality of planet gears and the ring gear) may be locked (grounded) to prevent rotation of that component or components. In this way, multiple different drive modes can be provided. Each drive mode may provide a different output torque.

The inventors have realised that there is a need for an improved epicyclic gear system.

SUMMARY

A first aspect of the present disclosure relates to a kit of parts to provide a reconfigurable epicyclic gear system, the kit of parts comprising: at least one sun gear; a planet carrier; a plurality of sets of planet gears configured to be mounted on the planet carrier and to mesh with the at least one sun gear; and a plurality of ring gears configured to mesh with the plurality of sets of planet gears; wherein the at least one sun gear, the plurality of sets of planet gears and the plurality of ring gears all have the same modulus such that they can be arranged in different configurations that each produce a different output torque.

In an embodiment, the at least one sun gear may comprise at least two sun gears which each have the same modulus.

In an embodiment, the at least two sun gears may comprise three sun gears each having the same modulus.

In an embodiment, the planet carrier may be configured to receive gears mounted in at least two planes.

In an embodiment, the plurality of sets of planet gears may comprise at least three sets of planet gears.

In an embodiment, each set of the plurality of planet gears may comprise the same number of planet gears.

In an embodiment, each set of the plurality of sets of planet gears may comprise two planet gears.

In an embodiment, each set of the plurality of planet gears may comprise three planet gears.

In an embodiment, the plurality of ring gears may comprise three ring gears.

In an embodiment, at least one of the plurality of ring gears may be a crown gear.

In an embodiment, the kit of parts may comprise a first drive motor.

In an embodiment, the first drive motor may be an axial flux motor.

In an embodiment, the kit of parts may comprise a second drive motor.

In an embodiment, the second drive motor may be an axial flux motor that can be connected in series with the first drive motor.

A second aspect of the present disclosure relates to the use of a kit of parts as described herein to provide a reconfigurable epicyclic gear system.

BRIEF DESCRIPTION OF THE DRAWINGS

Certain embodiments of the present disclosure will now be described in greater detail by way of example only and with reference to the accompanying drawings in which:

FIG. 5 shows a fifth arrangement of an epicyclic gear system that can be constructed from a kit of parts as disclosed herein;

DETAILED DESCRIPTION

A kit of parts as disclosed herein comprises at least one sun gear, a planet carrier, a plurality of sets of planet gears configured to be mounted on the planet carrier and to mesh with the at least one sun gear and a plurality of ring gears configured to mesh with the plurality of sets of planet gears. Each of the at least one sun gear, the plurality of sets of planet gears and the plurality of ring gears has the same modulus such that they can be arranged in different configurations (arrangements). In other words, the plurality of sets of planet gears and the plurality of ring gears are each interchangeable as they can all mesh with one another.

It will be appreciated that some configurations will not use all of the components included in the kit of parts, while other configurations may make use of all of the components of the kit of parts. In this way, the kit of parts can be used to create a number of different arrangements of components which allow a high degree of flexibility in creating epicyclic gear systems.

The components of the kit of parts may be easily assembled and disassembled to form a variety of different epicyclic gear systems. In this way, construction of different arrangements can be facilitated. For example, the kit of parts may be used to construct a first arrangement of an epicyclic gear system and then later disassembled and reassembled in a different configuration to create a second arrangement that is different from the first arrangement.

The ability to easily assemble and disassemble the kit of parts to form a plurality of different epicyclic gear systems may be particularly useful for prototyping such epicyclic gear systems. For example, the kit of parts may make it possible to quickly change or reconfigure a prototype design.

Alternatively or in addition, the ability to easily assemble and disassemble the kit of parts may be useful when maintenance is to be performed on an epicyclic gear system constructed from the kit of parts disclosed herein. By allowing the kit of parts to be easily disassembled, it may be possible to swap a particular component of the system for a new component (e.g. in the event that a component has become worn or otherwise broken) and quickly reassemble the epicyclic gear system such that maintenance of the system is made easier and quicker to perform.

The gear arrangements constructed from a kit of parts as disclosed herein may be used in any suitable and desired application. For example, epicyclic gear systems constructed from a kit of parts as described herein may be used in actuators for aircraft (including fixed-wing aircraft and helicopters), such as in ailerons, spoilers. It will be appreciated that epicyclic gear systems constructed from a kit of parts as disclosed herein may also be used in other vehicular and non-vehicular applications.

Figure 1:
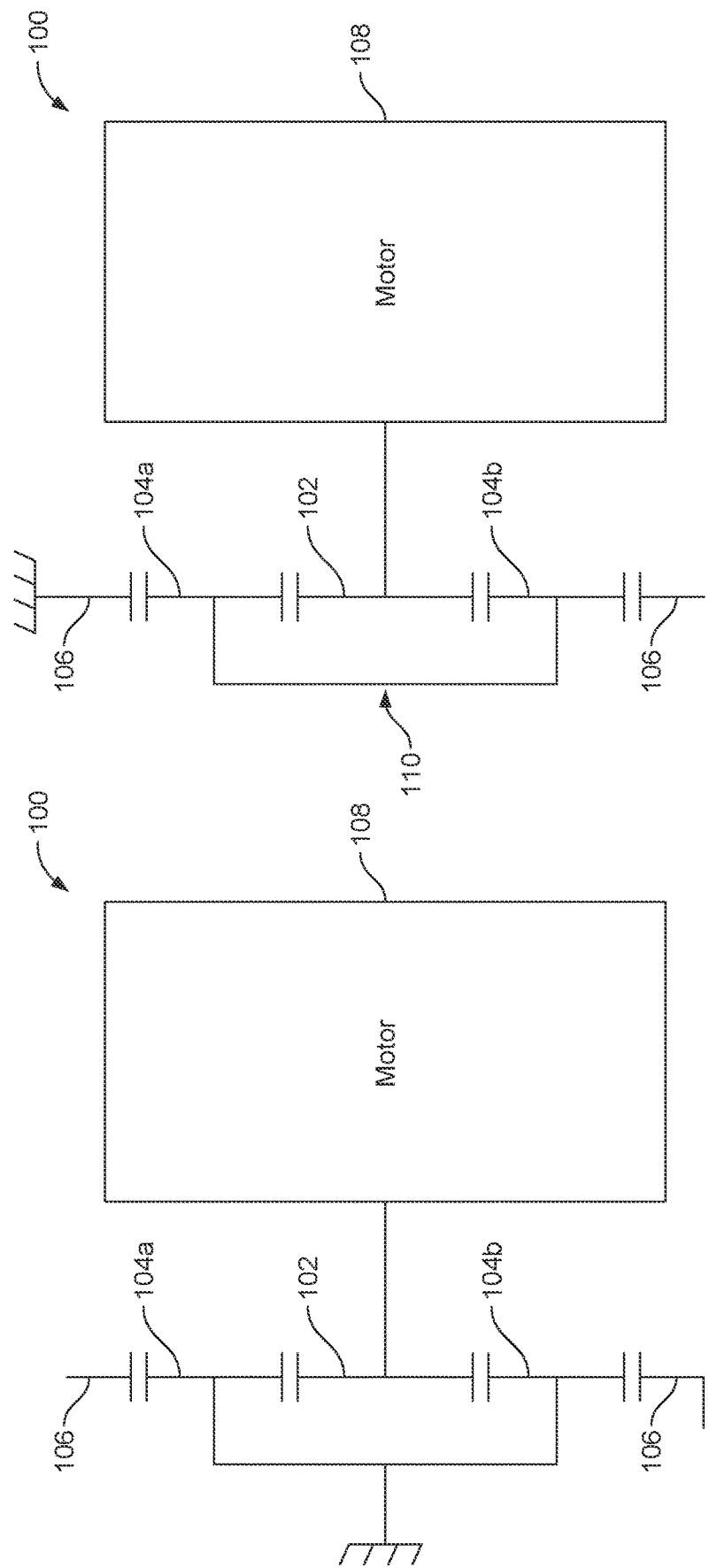
FIGS. 1A and 1B show a first arrangement of an epicyclic gear system that can be constructed from a kit of parts as disclosed herein.

FIGS. 1A and 1B show a first arrangement 100 of an epicyclic gear system that can be constructed from a kit of parts as disclosed herein. The first arrangement 100 comprises a first sun gear 102, a first set of planet gears comprising two planet gears 104a, 104b located radially outwardly of the sun gear 102 and configured to mesh with the sun gear 102, and a first ring gear 106 located radially outwardly of the planet gears 104a, 104b and configured to mesh with the planet gears 104a, 104b. The first arrangement 100 also comprises a first first drive motor 108 configured to drive the first sun gear 102, and a planet carrier (not shown) on which the planet gears 104a, 104b are mounted.

The first drive motor 108 may be any suitable and desired motor. In some embodiments, the first drive motor 108 is an axial flux motor. In some embodiments, the first drive motor 108 is provided as part of the kit of parts.

The sun gear 102 may have a larger diameter than each of the planet gears 104a, 104b in the first set of planet gears. Alternatively, the sun gear 102 may have a smaller diameter or the same diameter as each of the planet gears 104a, 104b. The planet gears 104a, 104b in the set of planet gears have the same diameter as one another. The ring gear 106 is dimensioned such that it can encircle the sun gear 102 and the set of planet gears 104a, 104b, and mesh with the planet gears 104a, 104b.

In FIG. 1A, the first arrangement 100 is configured such that the planet gears 104a, 104b are locked (grounded) and unable to rotate about their axes, while the sun gear 102 and ring gear 106 are free to move. The locking of the planet gears 104a, 104b may be achieved in any suitable and desired manner. For example, the locking may be achieved by any mechanism that renders the planet gears 104a, 104b unable to rotate about their axes. This may be done using one or more splines, one or more bolts, one or more pairs of mating parts, one or more load pins, etc. It will be appreciated that other means for locking the gears may also be used. It will further be appreciated that a combination of different locking means may be used in the same arrangement.

When the sun gear 102 is driven by the motor, the ring gear 106 is caused to rotate to provide the output 110 of the system. The output of the system may be configured to drive any suitable and desired moving component. For example, the output 110 of the system may be configured to move aircraft ailerons, propellers, vehicle spoilers, etc.

In FIG. 1B, the first arrangement 100 is configured such that the sun gear 102 and planet gears 104a, 104b are free to rotate about their respective axes, while the ring gear 106 is grounded. In this configuration, the ring gear 106 remains fixed in position when the sun gear 102 is driven, while the planet gears 104a, 104b rotate around the outside of the sun gear 102 (and around the inside of the ring gear 106). In this configuration, the planet gears 104a, 104b provide the system output 110.

Figure 2:
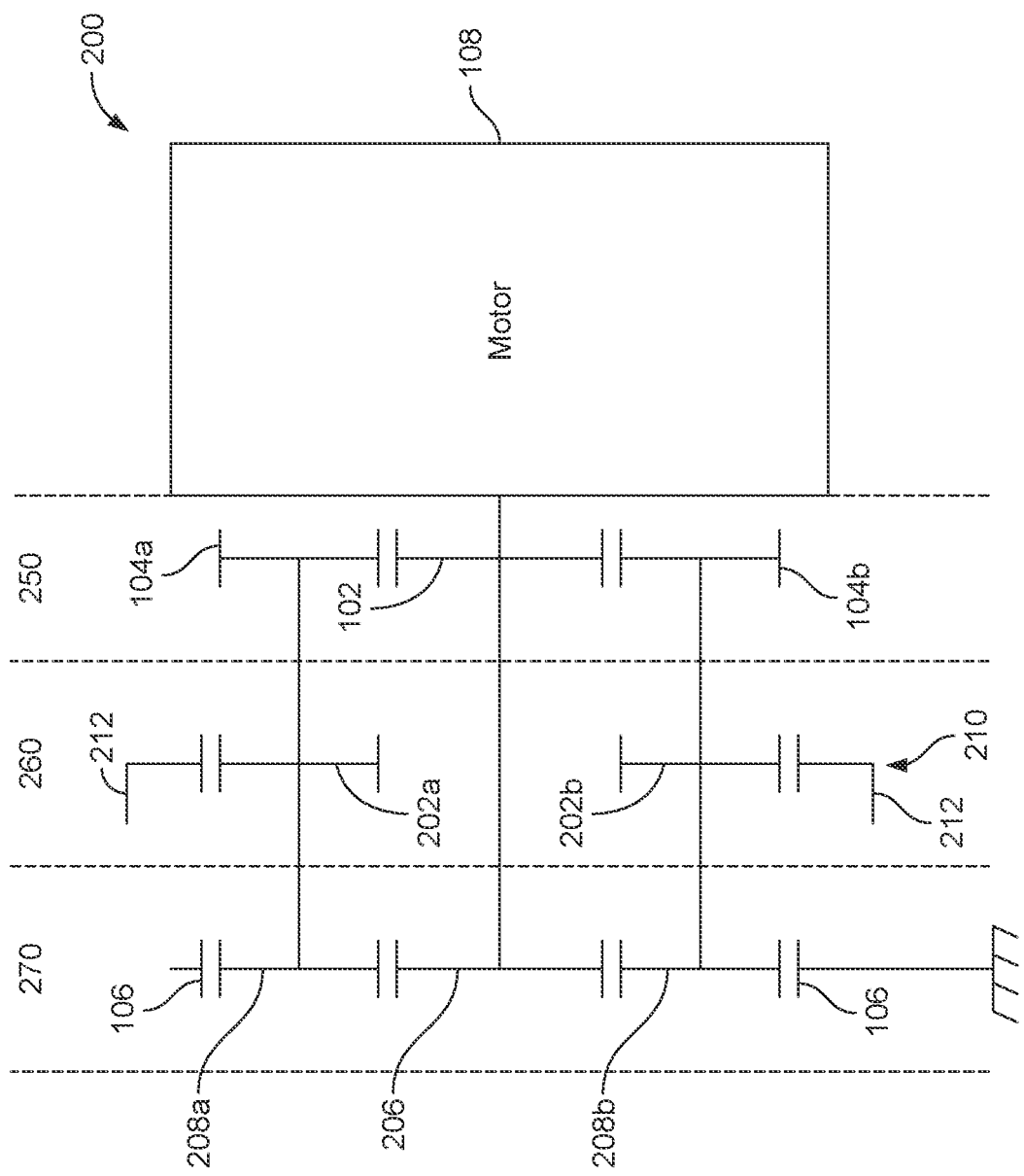
FIG. 2 shows a second arrangement of an epicyclic gear system that can be constructed from a kit of parts as disclosed herein.

FIG. 2 shows a second arrangement 200 of an epicyclic gear system that can be constructed from a kit of parts as disclosed herein. The second arrangement 200 comprises three gear planes 250, 260, 270. The first sun gear 102 and the first set of planet gears 104a, 104b are arranged in the first gear plane 250, with the first set of planet gears 104a, 104b arranged radially outwardly of the first sun gear 102. A second set of planet gears 202a, 202b is arranged in the second gear plane 260. The second set of planet gears 202a, 202b is connected to the first set of planet gears 104a, 104b so as to rotate in unison therewith. Also arranged in the second gear plane 260 is a second ring gear 212, which is used as output 210 in the illustrated configuration. A second sun gear 206, which is connected to the first sun gear 102 so as to rotate in unison therewith, is arranged in the third gear plane 270. A third set of planet gears 208a, 208b is arranged in the third gear plane 270 radially outwardly of the second sun gear 206. The first ring gear 106 is also arranged in the third gear plane 270, radially outwardly of the third set of planet gears 208a, 208b. The third set of planet gears 208a, 208b is also connected to the second set of planet gears 202a, 202b so as to rotate in unison therewith.

In the arrangement illustrated in FIG. 2, the gears in the second set of planet gears 202a, 202b have a larger diameter than those of the first and third sets of planet gears 104a, 104b, 208a, 208b. The internal diameter of the second ring gear 212 is larger than that of the first ring gear 108 in order to accommodate the larger diameter of the second set of planet gears 202a, 202b.

It will be appreciated that, in other embodiments, the first, second and third sets of planet gears 104a, 104b, 202a, 202b, 208a, 208b may have the same or different diameters. For example, all three sets may have the same diameter, two sets may have the same diameter while the remaining set has a different diameter, or all three sets may have different diameters. By providing different sets of planet gears having different diameters, it may be possible to achieve a wider variety of gear ratios, thereby ensuring improved flexibility in constructing different gearing arrangements from the kit of parts.

In a similar manner, the first and second sun gears 102, 206 may have the same diameter or different diameters. Equally, the first and second ring gears 106, 212 may have the same internal diameter or different internal diameters.

In the second arrangement 200, the first sun gear 102 is driven by the first drive motor 108. Since the second sun gear 206 is connected to the first sun gear 102, the second sun gear 206 is also caused to rotate when the first sun gear 102 is driven by the first drive motor 108. The rotation of the first and second sun gears 102, 206 causes the first and third sets of planet gears 104a, 104b, 208a, 208b to rotate in the first and third gear planes 250, 270 respectively. The first and third sets of planet gears 104a, 104b, 208a, 208b are connected to the second set of planet gears 202a, 202b such that the second set of planet gears 202a, 202b is also caused to rotate as a result of the sun gear 102 being driven by the motor 108. The second ring gear 212 is in turn caused to rotate by the rotation of the second and third sets of planet gears 202a, 202b, 208a, 208b, respectively. In the second arrangement 200, the first ring gear 106 is locked so as to not be able to rotate about its axis.

It will be appreciated that, as illustrated in the arrangement shown in FIGS. 1a and 1b, different components of the second arrangement 200 may be locked (grounded) in order to produce a different output. Likewise, different components may be used as output.

Figure 3:
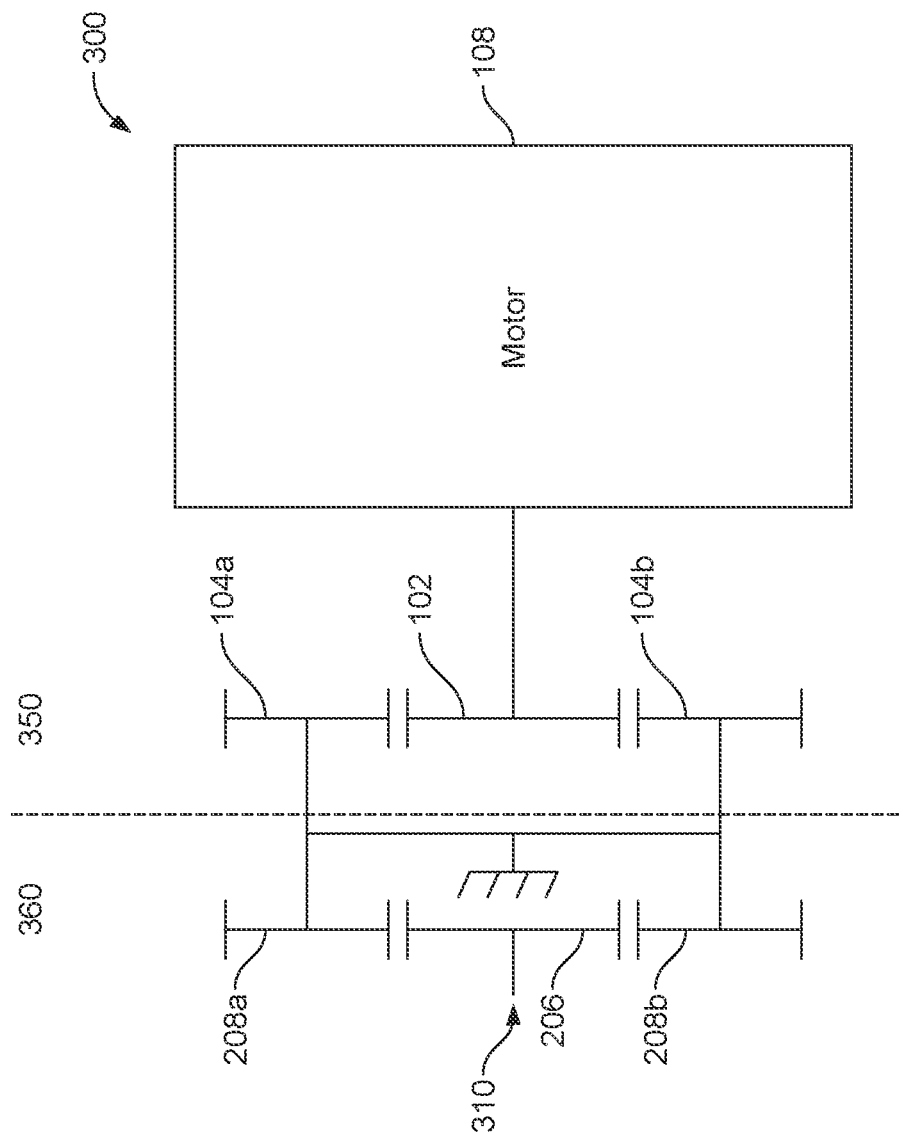
FIG. 3 shows a third arrangement of an epicyclic gear system that can be constructed from a kit of parts as disclosed herein.

FIG. 3 shows a third arrangement 300 of an epicyclic gear system that can be constructed from a kit of parts as disclosed herein. The third arrangement 300 makes use of the first and second sun gears 102, 206, and the first and third sets of planet gears 104a, 104b, 208a, 208b arranged in two gear planes 350, 360. In particular, the first sun gear 102 is arranged in a first gear plane 350 so as to mesh with the first set of planet gears 104a, 104b, while the second sun gear 206 is arranged in a second gear plane 360 so as to mesh with the third set of planet gears 208a, 208b.

In contrast to the second arrangement 200 shown in FIG. 2, the first and second sun gears 102, 206 are not connected so as to rotate in unison in the third arrangement 300. Instead, the first and second sun gears 102, 206 are configured to rotate independently of one another. The first sun gear 102 is driven by the first drive motor 108, which in turn causes the first set of planet gears 104a, 104b to rotate. Since the third set of planet gears 208a, 208b is connected so as to rotate in unison with the first set of planet gears 104a, 104b, the rotation of the first set of planet gears 104a, 104b also causes the rotation of the third set of planet gears 208a, 208b. The second sun gear 206 meshes with the third set of planet gears 208a, 208b such that the rotation of the third set of planet gears 208a, 208b causes rotation of the second sun gear 206. The second sun gear 206 is used as system output 310.

The first and third sets of planet gears 104a, 104b, 208a, 208b in the third arrangement 300 are locked such that rotation of the planet gears about their own axes is prevented. Instead, when the sun gear 102 rotates, the first and third sets of planet gears 104a, 104b, 208a, 208b rotate about the axis of the first sun gear 102.

It will be appreciated that, in an alternative configuration, the first and third sets of planet gears 104a, 104b, 208a, 208b may instead be allowed to rotate freely about their own axes.

Figure 4:
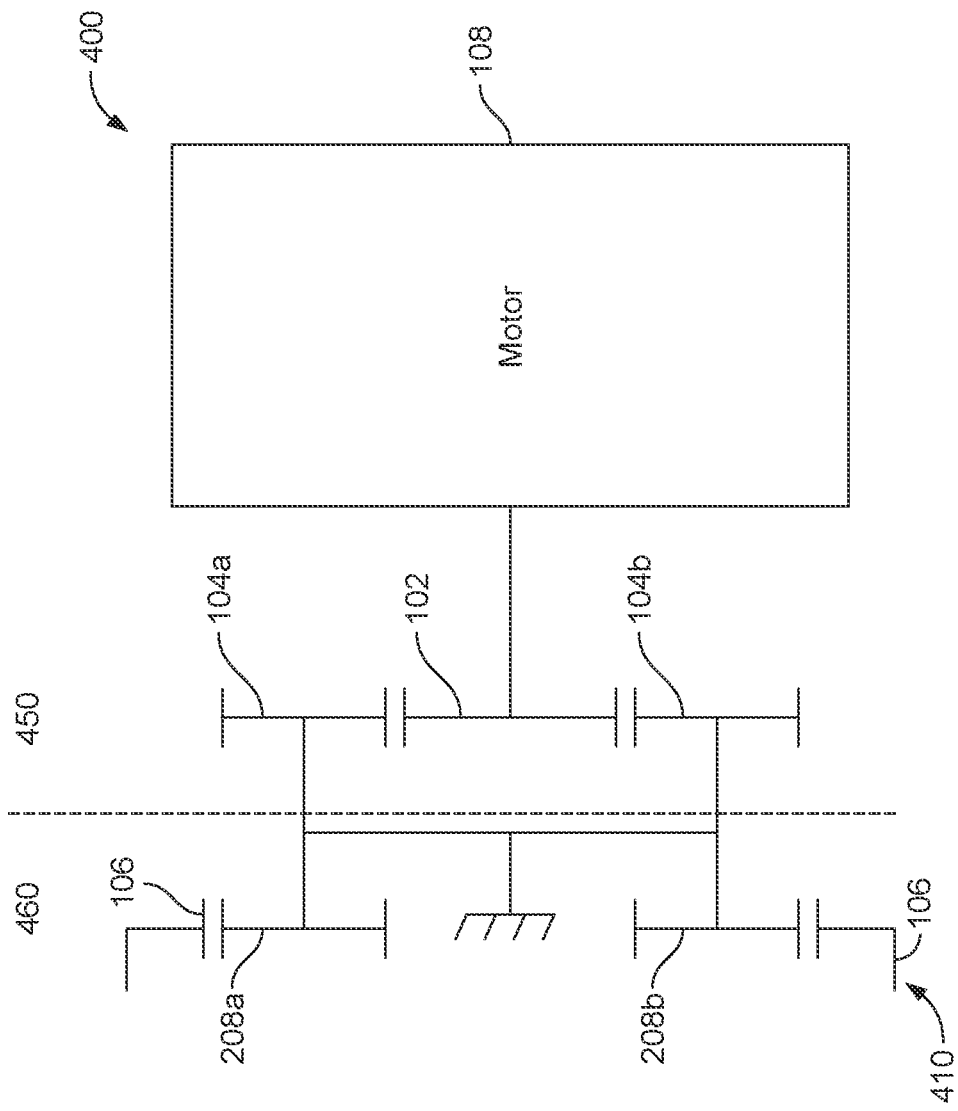
FIG. 4 shows a fourth arrangement of an epicyclic gear system that can be constructed from a kit of parts as disclosed herein.

FIG. 4 shows a fourth arrangement 400 of an epicyclic gear system that can be constructed from a kit of parts as disclosed herein. The fourth arrangement 400 is similar to the third arrangement 300. For the sake of conciseness, only the differences will be discussed herein.

The fourth arrangement 400 does not use the second sun gear 206. Instead, the fourth arrangement 400 comprises the first ring gear 106 arranged in the second gear plane so as to mesh with the third set of planet gears 208a, 208b. No ring gear is arranged in the first gear plane 450. In the fourth arrangement 400, the first ring gear 106 is used as system output 410.

FIG. 5 shows a fifth arrangement 500 of an epicyclic gear system that can be constructed from a kit of parts as disclosed herein. The fifth arrangement 500 is similar to the fourth arrangement 400. For the sake of conciseness, only the differences will be discussed herein.

The fifth arrangement 500 does not use any of the sun gears at all. Instead, the fifth arrangement 500 comprises a third ring gear 502 arranged in the first gear plane 550 so as to mesh with the first set of planet gears 104a, 104b. In the fifth arrangement 500, the third ring gear 502 is driven as input by the first drive motor 108. The first drive motor 108 and the third ring gear 502 may be connected to one another in any suitable and desired manner. In general, the first drive motor 108 and the third ring gear 502 may be connected to one another by means of any connection which allows rotary motion to be transferred. For example, the first drive motor 108 and the third ring gear may be connected to one another by means of a spline. The first ring gear 106, arranged in the second gear plane 560, is used as system output 510.

Figure 6A:
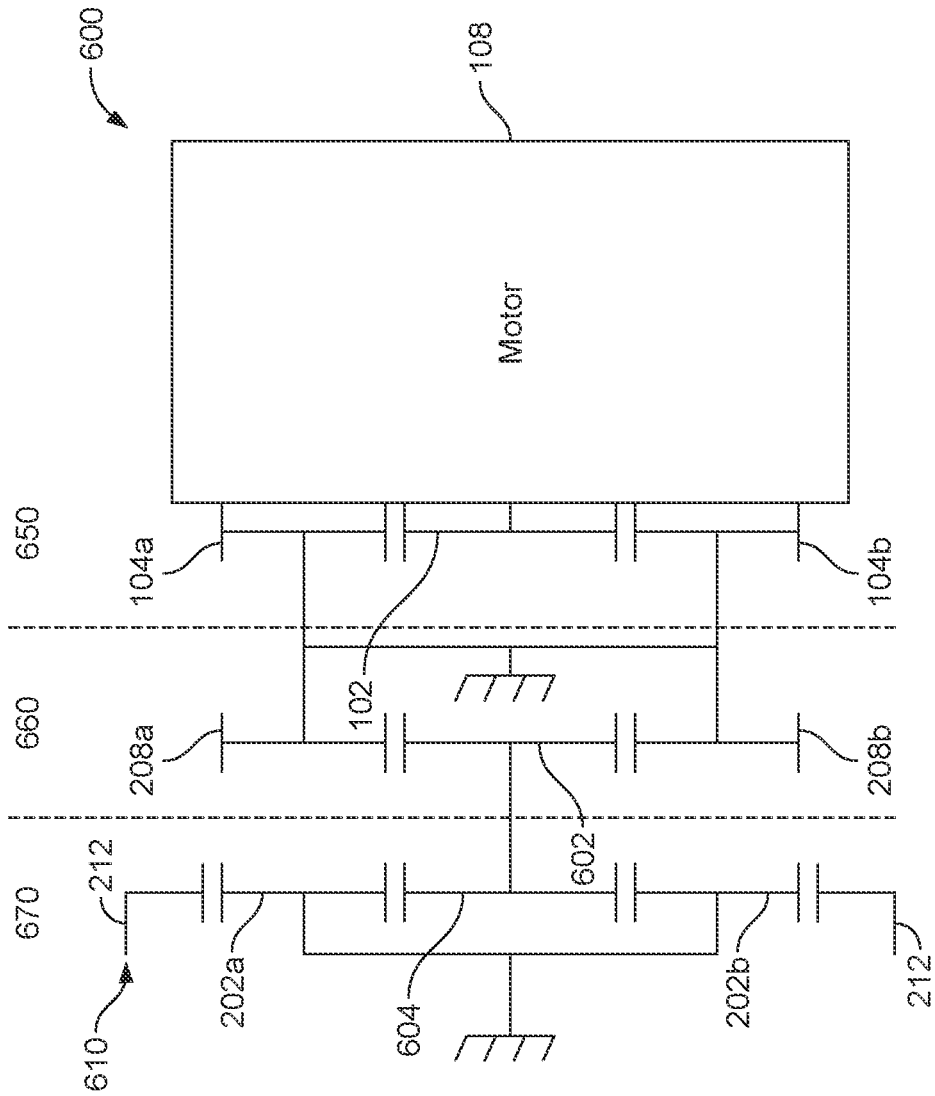
FIGS. 6A to 6C show a sixth arrangement of an epicyclic gear system that can be constructed from a kit of parts as disclosed herein.
Figure 6C:
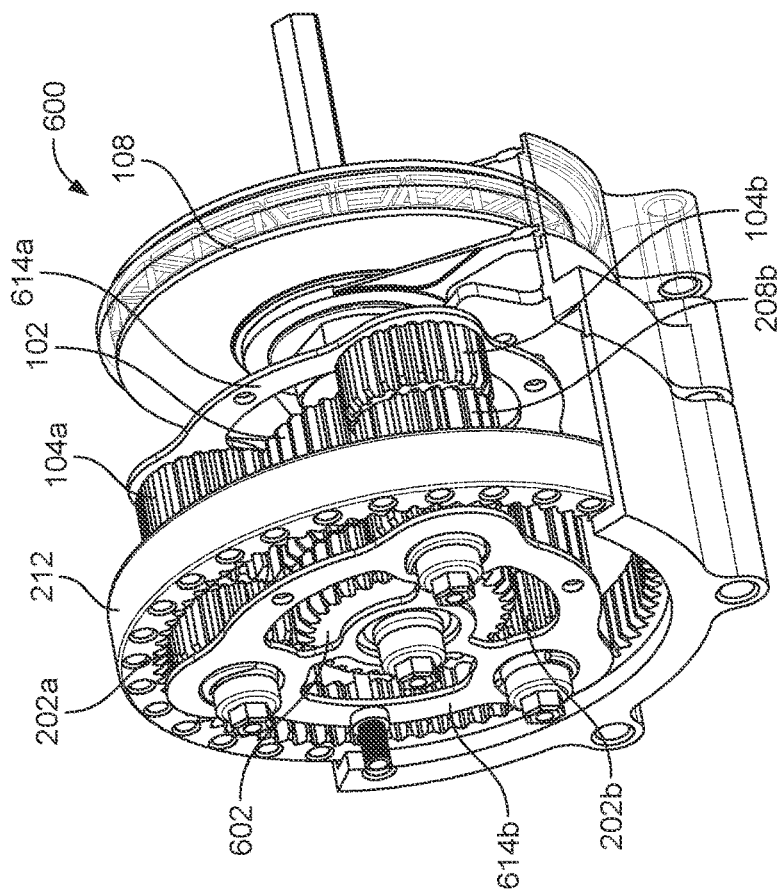
Figure 6B:
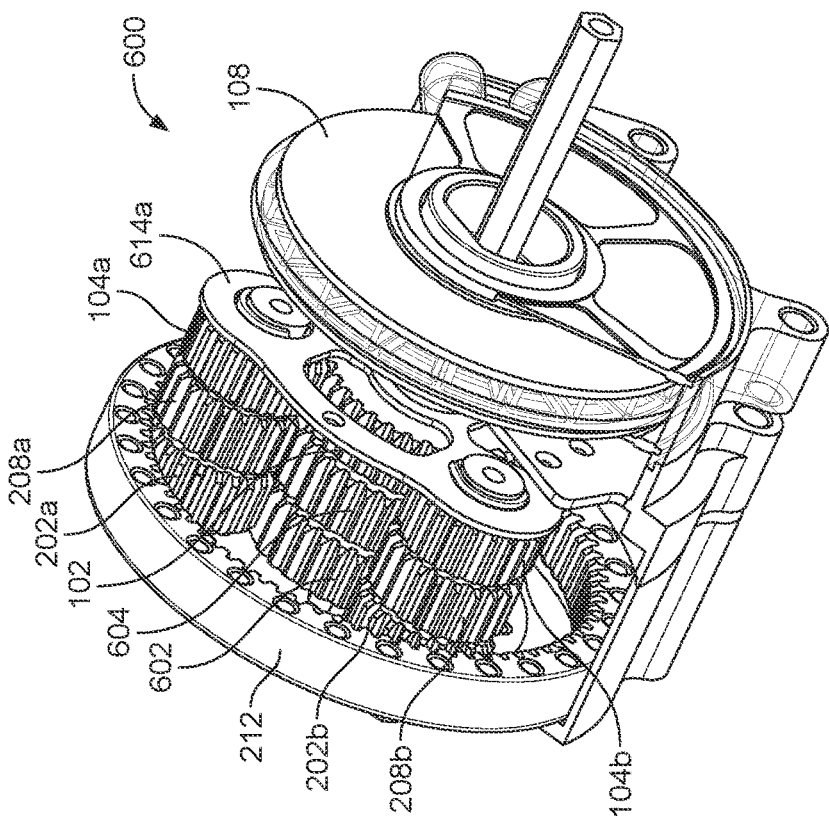

FIGS. 6A to 6C show a sixth arrangement 600 of an epicyclic gear system that can be constructed from a kit of parts as disclosed herein. The sixth arrangement 600 comprises the first sun gear 102 arranged in a first gear plane 650 so as to mesh with the first set of planet gears 104a, 104b. The motor 108 drives the first sun gear 102.

The sixth arrangement 600 further comprises the third set of planet gears 208a, 208b arranged in a second gear plane 660 so as to mesh with a third sun gear 602. The first and third sets of planet gears 104a, 104b, 208a, 208b are connected to one another and also locked so as not to be able to rotate about their respective axes. The first sun gear 102 and the third sun gear 602 are not directly connected to one another.

The sixth arrangement 600 further comprises the second set of planet gears 202a, 202b arranged in a third gear plane 670 so as to mesh with a fourth sun gear 604. The third and fourth sun gears 602, 604 are connected to one another so as to rotate in unison. The second set of planet gears 202a, 202b is locked such that the planet gears 202a, 202b cannot rotate about their own axes. Instead, they will be entrained by the fourth sun gear 604 as it rotates. The second ring gear 212 is arranged in the third gear plane 670 so as to mesh with the second set of planet gears 202a, 202b. The second ring gear 212 is used as output 610 of the sixth arrangement.

It can be seen in FIG. 6C that three planet gear axles are provided. As noted above, a plurality of planet gears is provided in each set of planet gears. It will be appreciated that sets of planet gears may comprise two, three, or more planet gears according to requirements. It will further be appreciated that sets of planet gears may not comprise the same number of gears; for example, a first set of planet gears may comprise two planet gears while a second set of planet gears within the same kit of parts may comprise four or more planet gears.

Figure 7:
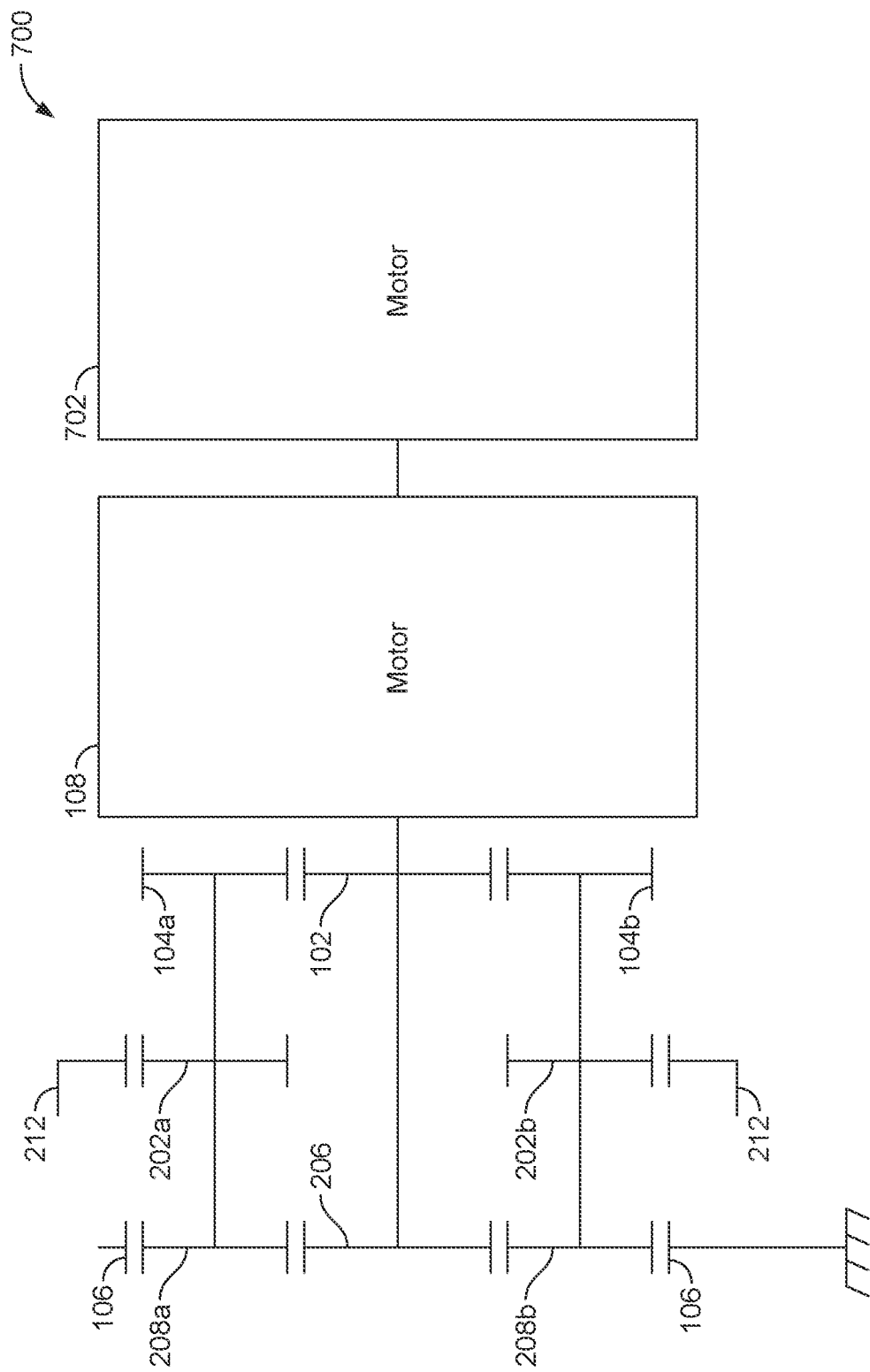
FIG. 7 shows a seventh arrangement of an epicyclic gear system that can be constructed from a kit of parts as disclosed herein.

FIG. 7 shows a seventh arrangement 700 of an epicyclic gear system that can be constructed from a kit of parts as disclosed herein. The seventh arrangement 700 is similar to the second arrangement 200. For the sake of conciseness, only the differences will be discussed herein.

The seventh arrangement comprises a first drive motor 108 and a second drive motor 702. The first and second drive motors 108, 702 are each axial flux motors. The first and second drive motors 108, 702 are connected in series. In this way, the input torque may be increased. In particular, the input torques of the first motor 108 and the second motor 702 may be summed together.

Figure 8A:
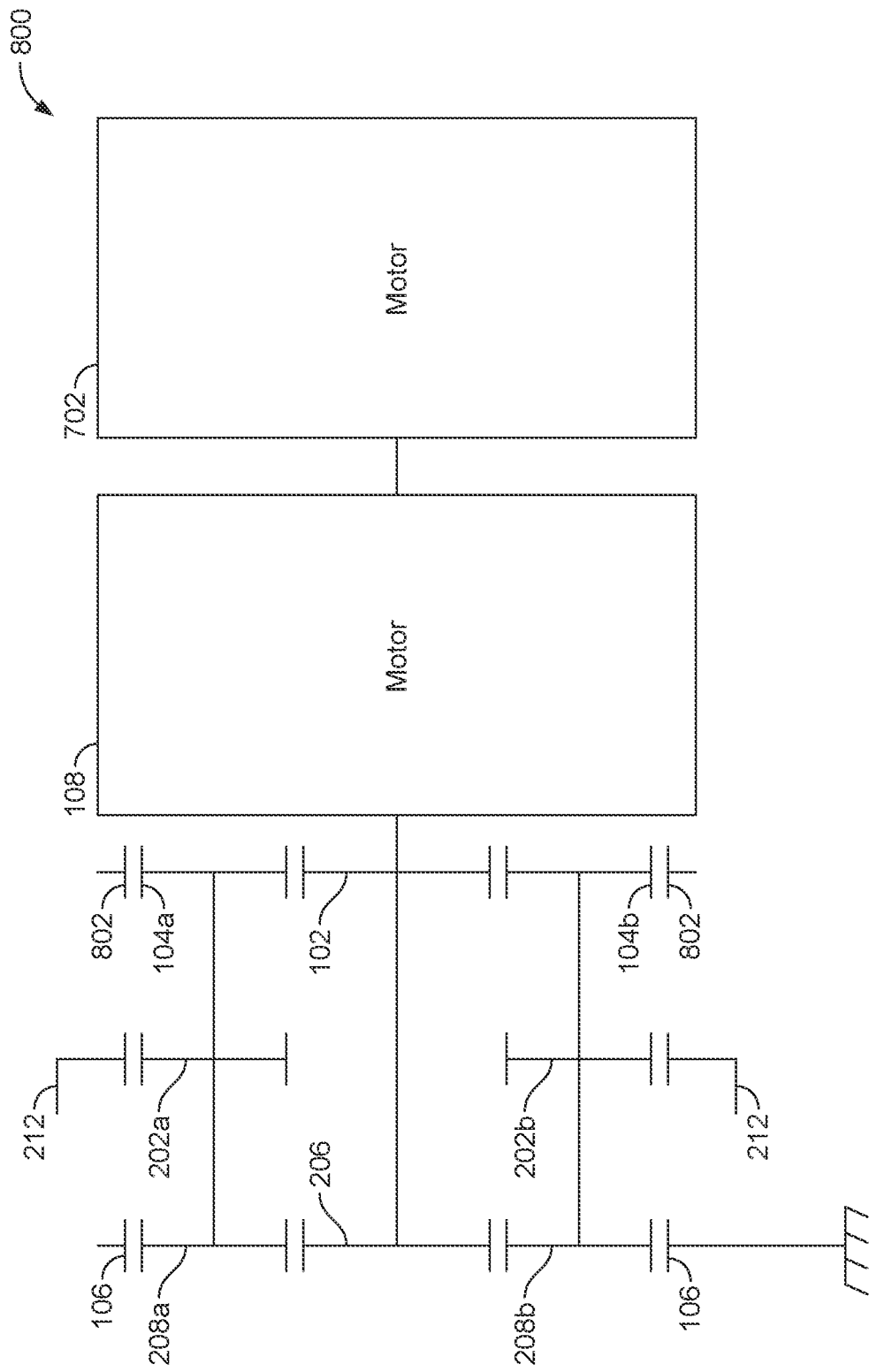
FIGS. 8A and 8B show an eighth arrangement of an epicyclic gear system that can be constructed from a kit of parts as disclosed herein.
Figure 8B:
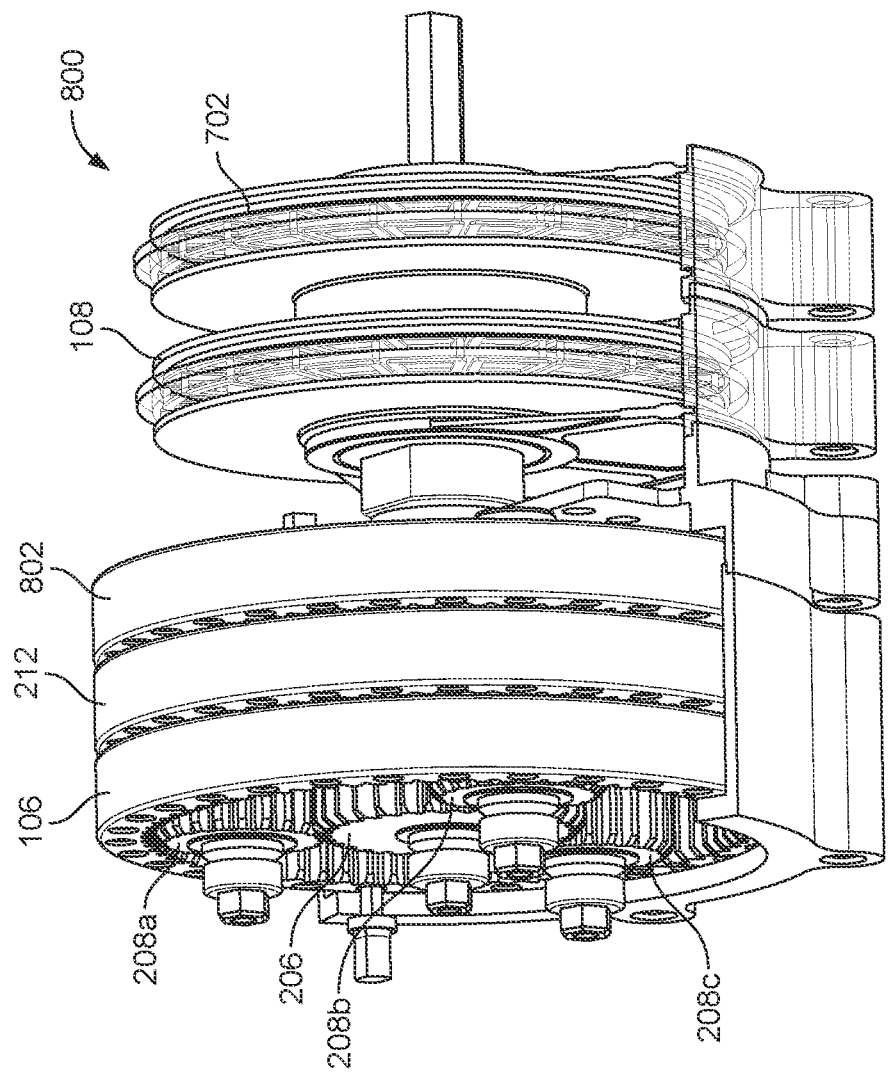

FIGS. 8A and 8B show an eighth arrangement 800 of an epicyclic gear system that can be constructed from a kit of parts as disclosed herein. The eighth arrangement 800 is similar to the seventh arrangement 700. The only difference is that the eighth arrangement 800 additionally comprises a fourth ring gear 802 which is arranged so as to mesh with the first set of planet gears 104a, 104b. It can be seen, therefore, that the eighth arrangement 800 comprises a ring gear for each of the gear planes in the arrangement.

In any of the disclosed embodiments, one or more of the ring gears 106, 212, 502, 802 may be a bevel gear. Optionally, one or more of the ring gears 106, 212, 502, 802 is a crown gear.

In an embodiment, there may be provided a third drive motor. Optionally, the third drive motor is an axial flux motor that can be connected in series with the first drive motor 108 and/or second drive motor 702.

From the above description of the appended drawings, it will be appreciated that many different arrangements can be constructed from a limited number of parts provided with a kit of parts according to the present disclosure. A kit of parts as disclosed herein makes it possible to provide a great deal of flexibility in creating a plurality of different gear arrangements which provide different output torques. This in turn makes a kit of parts as disclosed herein particularly useful for prototyping.

In addition, a kit of parts as disclosed herein may facilitate maintenance of gear systems constructed from such a kit of parts since it allows for one or more components of the system to be quickly and easily replaced with one or more new components, for example when the original component or components wear or become broken.

It will be appreciated that the embodiments described above are merely exemplary, and the skilled person will recognise that various modifications may be made thereto without departing from the scope of the disclosure.

The invention claimed is:

1. A kit of parts to provide a reconfigurable epicyclic gear system, the kit of parts comprising:
   at least one sun gear;
   a planet carrier;
   a plurality of sets of planet gears configured to be mounted on the planet carrier and to mesh with the at least one sun gear; and
   a plurality of ring gears configured to mesh with the plurality of sets of planet gears;
   wherein the at least one sun gear, the plurality of sets of planet gears and the plurality of ring gears all have the same modulus such that they can be arranged in different configurations that each produce a different output torque;
   wherein the planet carrier is configured to receive gears mounted in at least two planes;
   wherein the plurality of sets of planet gears comprises at least three sets of planet gears; and
   wherein only one of the ring gears is fixed;
   wherein the at least one sun gear comprises at least two sun gears which each have the same modulus.

2. The kit of parts according to claim 1, wherein the at least two sun gears comprise three sun gears each having the same modulus.

3. The kit of parts according to claim 1, wherein each set of the plurality of planet gears comprises the same number of planet gears.

4. The kit of parts according to claim 1, wherein each set of the plurality of sets of planet gears comprises two planet gears.

5. The kit of parts according to claim 1, wherein each set of the plurality of planet gears comprises three planet gears.

6. The kit of parts according to claim 1, wherein at least one of the plurality of ring gears is a crown gear.

7. A reconfigurable drive train system comprising:
   a kit of parts according to claim 1; and
   a first drive motor.

8. The reconfigurable drive train according to claim 7, wherein the first drive motor is an axial flux motor.

9. The reconfigurable drive train according to claim 8, further comprising a second drive motor.

10. The reconfigurable drive train according to claim 9, wherein the second drive motor is an axial flux motor that can be connected in series with the first drive motor.

11. A kit of parts to provide a reconfigurable epicyclic gear system, the kit of parts comprising:
    at least one sun gear;
    a planet carrier;
    a plurality of sets of planet gears configured to be mounted on the planet carrier and to mesh with the at least one sun gear; and
    a plurality of ring gears configured to mesh with the plurality of sets of planet gears;
    wherein the at least one sun gear, the plurality of sets of planet gears and the plurality of ring gears all have the same modulus such that they can be arranged in different configurations that each produce a different output torque;
    wherein the planet carrier is configured to receive gears mounted in at least two planes;
    wherein the plurality of sets of planet gears comprises at least three sets of planet gears; and
    wherein only one of the ring gears is fixed;
    wherein the plurality of ring gears comprises three ring gears.

12. A reconfigurable drive train system comprising:
    a kit of parts according to claim 11; and
    a first drive motor.

13. The reconfigurable drive train according to claim 12, wherein the first drive motor is an axial flux motor.

14. The reconfigurable drive train according to claim 13, further comprising a second drive motor.

15. The reconfigurable drive train according to claim 14, wherein the second drive motor is an axial flux motor that can be connected in series with the first drive motor.

16. The kit of parts according to claim 11, wherein each set of the plurality of planet gears comprises the same number of planet gears.

17. The kit of parts according to claim 11, wherein each set of the plurality of sets of planet gears comprises two planet gears.

18. The kit of parts according to claim 11, wherein each set of the plurality of planet gears comprises three planet gears.

* * * * *